UNITED STATES PATENT OFFICE.

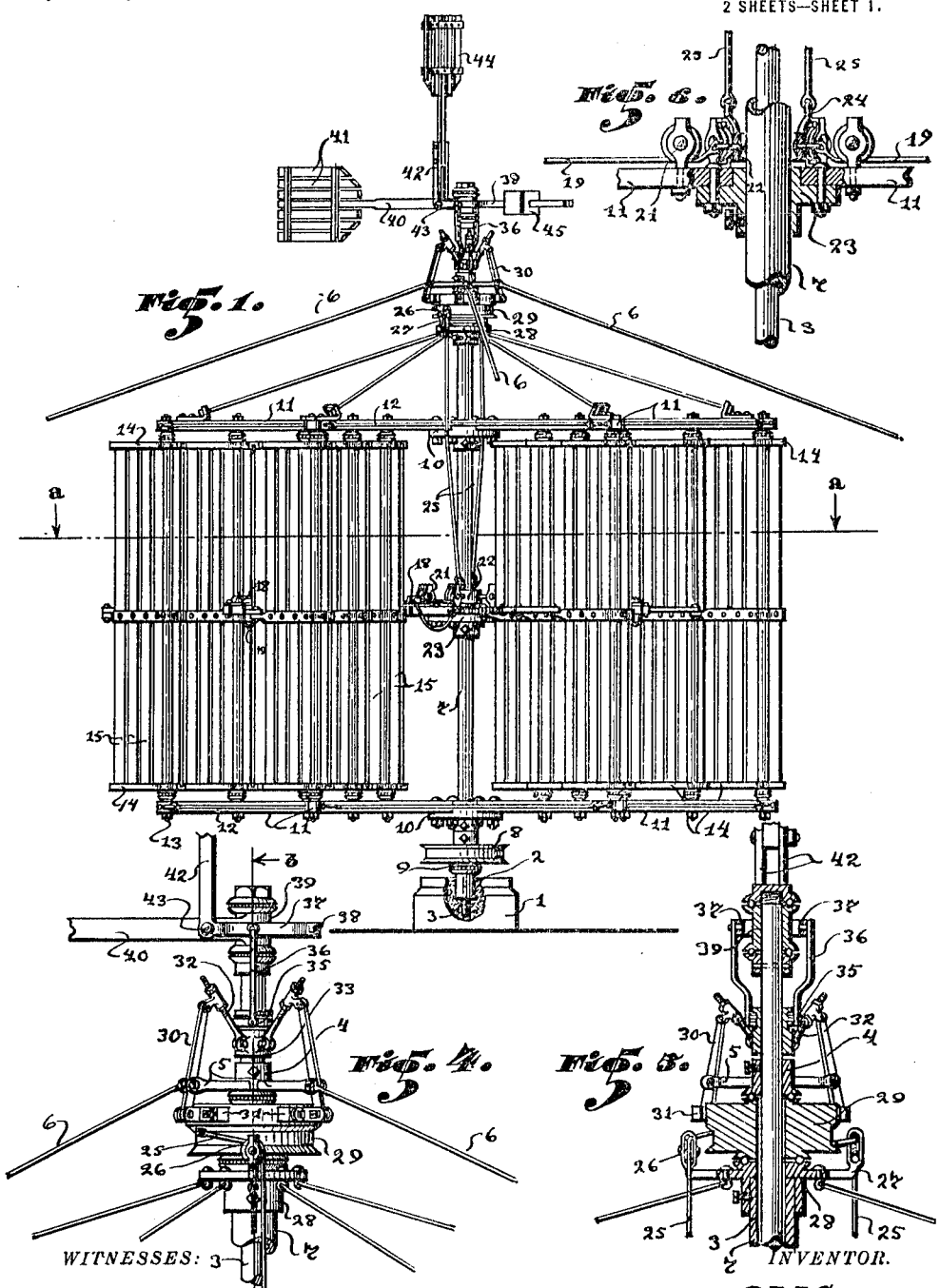

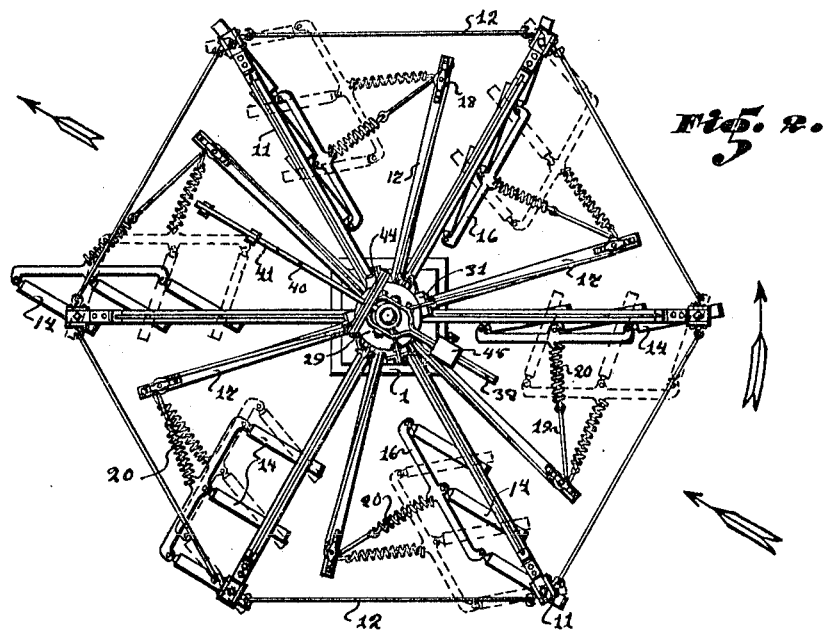

OSCAR M. COX, OF LOCKNEY, TEXAS.

WINDMILL.

1,273,582. Specification of Letters Patent. Patented July 23, 1918.

Application filed August 3, 1914, Serial No. 854,607. Renewed December 18, 1917. Serial No. 207,796.

*To all whom it may concern:*

Be it known that I, OSCAR M. COX, a citizen of the United States, residing at Lockney, in the county of Floyd and State of Texas, have invented certain new and useful Improvements in Windmills, of which the following is a specification.

My invention relates to a new and useful windmill, and its object is primarily to provide a windmill designed to yield an unusual efficiency, and constructed in such a manner that it may be readily built in large sizes, making it possible to convert the force of the wind into electrical energy or mechanical energy in any desired form.

It is another object of my invention to provide a windmill equipped with an automatic governor that will bring the vanes of the mill edgewise to the wind when the latter reaches such a velocity as to make it advisable to discontinue operation of the windmill.

Finally the object of the invention is to provide a device of the character described, that will be strong, durable, efficient and simple and comparatively inexpensive to produce, also one in which the several parts will not be likely to get out of working order.

With the above and other objects in view, the invention has relation to certain novel features of construction and operation, an example of which is described in the following specification and illustrated in the accompanying drawings, wherein:

Figure 1 is a view showing my improved windmill in side elevation.

Fig. 2 is a plan view of the same, the direction of the wind being indicated by arrows.

Fig. 3 is a horizontal sectional view taken upon the line *a—a* of Fig. 1.

Fig. 4 is a detail elevational view of the upper portion of my windmill.

Fig. 5 is an axial sectional view of the same, the section being taken upon the line *b—b* of Fig. 4.

Fig. 6 is an axial sectional view of the ring and hub construction intermediate of the ends of the revoluble shaft.

Referring now more particularly to the drawings, wherein like reference characters designate similar parts in all the figures, the numeral 1 denotes a block of concrete constituting a foundation for my windmill. In this foundation, there is embedded a thrust bearing 2, through which is passed the lower extremity of a vertical shaft 3, projecting slightly below the member 2 and rigidly connected with said member in any desired manner. The rigid shaft 3 is engaged at its upper portion by a set collar 4 from which a number of short radial arms 5 project equidistantly. From each of said arms a guy wire 6 is extended, which wires in conjunction serve to maintain the shaft 3 in its proper vertical position. Upon the rigid shaft 3 a revoluble shaft 7 is mounted, and carries fast upon its lower end a pulley 8 from which power may be transmitted in the usual manner to a pump, electric generator or any other machine. The pulley 8 has formed upon its under side a thrust bearing member 9 which is paired with the rigid thrust bearing member 2, balls being interposed between the two thrust bearings to decrease friction during operation of my windmill. Just above the pulley 8 a hub 10 is mounted fast upon the sleeve 7, and a similar hub is mounted upon the upper portion of said sleeve. To each hub 10, there is secured a plurality of equidistant radial arms 11, the upper and lower arms 11 being paired. The extremities of each set of arms 11 are connected by brace wires 12 (see Figs. 2 and 3), thus giving increased strength and resiliency to the spider formed by each hub 10 and the correlated projecting arms.

Between each pair formed by an upper and a lower radial arm 11, there are extended three equidistant vertical pivot rods 13, upon each of which rods, there is mounted a vane comprised of upper and lower horizontal end pieces 14 and vertical slats 15 rigidly extending between the parts 14. The vanes are each similarly pivoted adjacent to one of their lateral edges, as is clearly indicated in Fig. 3, and their other lateral edges have pivotal connected at intermediate points with a swinging bar 16, whereby each set of three adjacent vanes are maintained parallel in any position of rotation about their pivot rods. On a horizontal level with the bars 16 a plurality of arms 17 project rigidly from the shaft 7, the arms 17 being equal in number to each set of arms 11. Upon the outer end of each arm 17 there is revolubly mounted a small pulley 18, upon which is carried a cord 19, passing from said pulley in one direction toward an adjacent bar 16 to which it is centrally connected through a coiled spring 20. In its other direction the cord extends from the correlated pulley 18 along the correlated arm 17 to the inner end of said arm, and thereafter passing beneath a small pulley 21 is secured to a ring 22 encircling the sleeve 7 just above the hub 23 to which the inner ends of the arms 17 are secured. The ring 22 is formed with a pair of diametrically opposite upwardly projecting lugs 24, to each of which is attached the lower end of a cord 25. The two cords 25 respectively are carried over small pulleys 26 mounted in brackets 27 projecting at diametrically opposite points from a cap 28 fast upon the upper end of the sleeve 7. From the pulleys 26, the cords 25 are respectively extended to opposite points upon the face of a drum 29, and are secured to said drum at said points, the drum 29 being loosely mounted upon the shaft 3 above the cap 28, a circle of balls being interposed between said drum and said cap and also between the drum and the collar 4 which lies just above the drum. The arms 5 which project radially from the collar 4 form pivotal supports at their outer ends for levers 30, which are inclined slightly toward the axis of the windmill from their lower to their upper ends. The upper ends of the levers 30 are pivotally engaged with arms 32 extending outwardly at an upward inclination from a collar 33, slidable upon the shaft 3 just above the collar 4, and restricted from rotation by its connection with the collar 4 through the parts 30 and 32. The collar 33 has its upper end portion grooved to receive a loose fitting collar 35, from diametrically opposite points of which arms 36 are extended upwardly, their upper extremities being respectively pivotally engaged with spaced portions 37 of a bell-crank arm 38, normally occupying a horizontal position. The portions 37 of said arms extend at each side of a collar 39 loosely mounted on the upper end of the shaft 3, and from said collar a horizontal arm 40 projects rigidly in an opposite direction from the arm 38, a vertical vane formed with horizontal slats 41 being mounted upon the outer end of the arm 40 (see Fig. 1). The bell-crank arm 38 is correlated with an upwardly projecting arm 42, the bell-crank being pivoted at the juncture of the two arms 38 and 42 as indicated at 43, this pivotal point being upon the arm 40 adjacent to the collar 39 (see Fig. 4). The arm 42 is surmounted by a normally vertical vane 44, the plane of which is transverse with that of the vane 41. Upon the outer end of the arm 38 a weight 45 is adjustably mounted. The slats 15 of the vane have their pivoted supports 13 so arranged that when the slats are inclosed and the vane in operaitve position, the slats overlap as clearly shown in Fig. 2 and Fig. 3.

The various features of the construction of my invention having been above fully described, an explanation will now be given as to the operation of the device. Considering the direction of the wind to be that indicated by the rectilinear arrows in Fig. 2, the direction of rotation of the revoluble parts will be that indicated by the arcuate arrow in the same figure; namely, counter-clock-wise. Whatever the direction of the wind may be, the direction of rotation of the wind wheel will remain the same. As each set of three vanes in its rotation is moving parallel or approximately parallel to the direction of the wind, the vanes will be forced by the wind pressure to a position in which they will offer a maximum resistance to the wind and hence subject the wind wheel to a maximum tendency to rotation. When the vanes in their rotation are moving against the wind either directly or approximately the pressure of the wind will cause them to assume a position edgewise to the wind so that their resistance in traversing this portion of their path of rotation is negligible. The vane 41 serves to maintain the bell-crank comprising the arms 38 and 42 constantly in a position in which the vane 44 is transverse with the wind. When the force of the wind becomes excessive, said bell crank may be displaced to a certain extent above the pivot 43, the weighted arm 38 being elevated. The upward movement of the arm 38 is communicated through the arms 36 to the collar 33, and the upward sliding displacement of said collar acts through the arms 32 to displace the upper extremities of the levers 30 outwardly thereby applying the brake shoes 31 to the brake wheel or drum 26. The rotation of the said drum being thus retarded, the cords 25 will tend to wind upon said drum at their upper ends, and the collar 22 to which the lower ends of said cords are secured will thereby be elevated slightly. This will result in each of the cords 19 being subjected to a pull toward the vertical axis of rotation the windmill, swinging all of the wind wheel vanes to the positions indicated in dash lines in Fig. 2. When the vanes are rigidly maintained in the specified positions, they offer only slight resistance to the wind and this resistance being equally distributed at each side of the axis of the windmill, no rotation will result. When the vanes occupy the positions illustrated in dash lines in Fig. 2, the springs 20 will allow said vanes to undergo such slight oscillatory movement as may be necessary to prevent their being damaged by the force of the wind.

The invention is presented as including all such modifications and changes as properly come within the scope of the following claims.

What I claim is:

1. A windmill comprising a revoluble shaft, a pair of spiders respectively fast upon the end portions of said shaft, their arms being alined parallel to the shafts, a plurality of vanes interposed between each pair of alined arms, a bar establishing swinging connection between corresponding edges of each set of vanes, a spider intermediately mounted upon the shaft having its arms extending between the set of vanes, pulleys mounted on the extremities of the arms of the last named spider, cords each having connection with one of said swinging bars and each extending toward the shaft along one arm of the last named spider after being carried over the pulley on the outer end thereof, a pulley mounted upon the inner end of each of said spider arms, the cord correlated with said arm being passed through a quarter turn on said pulley, a collar concentric with the shaft, to which each of said cords are secured, a counterbalanced normally upstanding vane, and means actuated by a displacement of said vane from its normal position communicating a displacement to said collar whereby said cords are placed in tension shifting the vanes each to a substantially tangential position.

2. A windmill comprising a vertical shaft, a pair of vertically spaced spiders revoluble about said shaft, a plurality of vertical vanes revoluble about said shaft, extending between the two spiders, an arm loosely mounted on the upper end of said shaft projecting therefrom, a vertical vane carried by the outer end of said arm, a bell-crank pivoted at its apex upon the inner end of said arm, comprising an upwardly and a horizontally projecting arm, the latter being weighted, a vane surmounting the upwardly projecting arm, a collar vertically adjustable upon the shaft below the bell-crank, a swinging connection between said collar and the horizontally projecting arm of said bell-crank, a brake drum loosely mounted upon the shaft below said collar, brake shoes normally spaced from said collar, and a mechanism actuated by the vertical displacement of the sliding collar for applying the brake shoes to the brake drum, cords adapted to be wound upon the brake drum and adapted to actuate the vanes of a wind wheel to a position which they rigidly maintain.

In testimony whereof I have signed my name to this specification in the presence of two subscribing witnesses.

OSCAR M. COX.

Witnesses:
CHARLES CLEMENTS,
A. E. SULLIVAN.

Copies of this patent may be obtained for five cents each, by addressing the "Commissioner of Patents, Washington, D. C."